United States Patent [19]

Timmerman et al.

[11] Patent Number: 5,252,445

[45] Date of Patent: Oct. 12, 1993

[54] ELEMENT CONTAINING SOLVENT-RESISTANT POLYMER BEADS

[75] Inventors: Daniel M. Timmerman, Mortsel; Etienne A. Van Thillo, Essen; Bavo A. Muys, Mortsel, all of Belgium

[73] Assignee: Agfa-Gevaert, N.V., Mortsel, Belgium

[21] Appl. No.: 730,479

[22] Filed: Jul. 16, 1991

[30] Foreign Application Priority Data

Jul. 20, 1990 [EP] European Pat. Off. ........ 90202019.7

[51] Int. Cl.$^5$ .............................................. G03C 1/85
[52] U.S. Cl. .................................... 430/529; 430/527; 430/536; 430/950; 428/480; 428/483; 428/913; 525/191
[58] Field of Search ............... 430/523, 529, 531, 536, 430/537, 950, 527; 428/480, 483, 913; 346/835.1; 525/191

[56] References Cited

U.S. PATENT DOCUMENTS

| | | | |
|---|---|---|---|
| 4,022,622 | 5/1977 | Timmerman et al. | 430/529 |
| 4,301,240 | 11/1981 | Bruck et al. | 430/536 |
| 4,614,708 | 9/1986 | Timmerman et al. | 430/536 |
| 4,677,050 | 6/1987 | Yokoyama et al. | 430/536 |
| 4,828,927 | 5/1989 | Timmerman et al. | 430/529 |
| 5,096,975 | 3/1992 | Anderson et al. | 430/529 |
| 5,104,779 | 4/1992 | Säverin et al. | 430/529 |
| 5,713,396 | 12/1992 | Nagasaki et al. | 430/536 |

Primary Examiner—Jack P. Brammer
Attorney, Agent, or Firm—Breiner & Breiner

[57] ABSTRACT

Method of preparing solvent-resistant polymer beads sizing 0.5-5 pm and having a glass transition temperature of at least 40° C. by dissolving in a solvent mixture of water and water-miscible polar organic solvent an Alpha, Beta-ethylenically unsaturated monomer (1) capable of forming a polymer that is soluble in the monomer(s) present in said solvent mixture but which is insoluble in said solvent mixture, a monomer (2) carrying COOH group(s), a monomer (3) carrying halogen atom(s), a free radical-forming polymerization initiator, and a graft-polymerizable polymer containing hydrophilic groups, heating the solution obtained to a temperature from 50° C. to the reflux temperature thereof with stirring to form said beads, converting said COOH group(s) by reaction with a hydroxide into a carboxylic acid salt group, and causing said carboxylic acid salt group to react with said halogen atom to form ester cross-linkages. The beads can be used as spacing agents in a sheet or web material.

8 Claims, No Drawings

ELEMENT CONTAINING SOLVENT-RESISTANT POLYMER BEADS

BACKGROUND OF THE INVENTION

1. Field of the Invention

The present invention relates to a method for preparing finely divided solid polymer beads that are insoluble in water, in organic solvents, and in mixtures of water and organic solvents. The invention also relates to the use of such polymer beads as spacing agents in a sheet or web material such as a recording material e.g. a light-sensitive silver halide material.

2. Description of the Prior art

It is known that hydrophobic resin sheet and web materials having a low conductivity readily become charged electrostatically, especially in a relatively dry atmospheric environment, as a result of friction against dielectric materials and/or of contact with electrostatically chargeable transport means e.g. rollers.

Sheets and webs of hydrophobic resins e.g. polyesters or cellulose triacetate are commonly used as support element of recording materials e.g. a light-sensitive silver halide material. Such materials are subjected to frictional contact with other elements during their manufacture e.g. during a coating or sizing stage, and during their use e.g. during the recording of information in a flow camera or movie camera and during image processing and image projection as can be the case for photographic silver halide recording materials.

Especially in the reeling up or unreeling of dry photographic film in a camera or projector high friction may occur, which may give rise to electrostatic charges that may attract dust or cause sparking. In unprocessed photographic silver halide recording materials sparking causes developable fog and thus degrades the image quality.

For the purpose of reducing electrostatic charging of sheet or web materials comprising a hydrophobic resin support carrying at least one silver halide emulsion layer and at the same time not impairing their transparency, ionic compounds have been incorporated into these materials e.g. in the silver halide emulsion layer(s). However, ionic compounds migrate out of a silver halide emulsion layer during its different wet processing treatments. To avoid such migration preference has been given to antistatic high molecular weight polymeric compounds having ionic groups at frequent intervals in the polymer chain (cfr "Photographic Emulsion Chemistry" by G.F. Duffin, The Focal Press - London and New York (1966) - Focal Press Ltd., page 168).

From U.S. patent application no. 3,525,621 it is known that antistatic properties can be given to an aqueous coating composition by incorporating therein almost any silica sol, but preferably silica having a high surface area of the order of magnitude of 200-235 m2 per gram in combination with an alkali metal salt of an alkylaryl polyethersulphonate. The applied alkali metal salt of an alkylaryl polyethersulphonate is a highly water-soluble compound that leaches out during photographic aqueous processing so that the antistatic character of the support, on which the antistatic composition is coated, decreases markedly. As a consequence, the antistatic behaviour of the processed and dried material is unsatisfactory, since the residual colloidal silica fails to sufficiently reduce the surface resistivity.

According to EP-A 334,400 a sheet or web material is provided, which comprises an optionally subbed hydrophobic resin or paper support coated with at least one hydrophobic resin layer and having on at least one side thereof an outermost antistatic layer containing colloidal silica, wherein the antistatic layer is free from any cationic surfactant and consists for at least 70 % by weight of colloidal silica having an average particle size not higher than 10 nm and a surface area of at least 300 m2 per gram, the colloidal silica being present at a coverage of at least 50 mg per m2. When such sheet or web material is part of a photographic silver halide material, the antistatic layer retains a low surface resistivity after wet photographic processing and drying but has the disadvantage of sticking under mild pressure to hydrophilic colloid layers such as layers containing gelatin. This is particularly disturbing when the antistatic layer of the photographic material during storage or reeling up thereof comes into contact with other layers containing gelatin. For instance, when the photographic material is in rolled up state, the antistatic layer, which is at the rear side of the photographic silver halide material, can stick to the emulsion layer(s) on the opposite side. During unrolling of the photographic material damage can be caused since parts of the emulsion layer(s) or of the antistatic layer can be torn off.

According to the unpublished EP application 90200482.9 entitled "Sheet or web material having antistatic properties" and filed on Mar. 1, 1990 the sticking of an above-mentioned antistatic layer containing colloidal silica to layers containing gelatin is avoided by covering the antistatic layer with a layer that has a poorer sticking power to a gelatin layer than said antistatic layer containing colloidal silica, said covering layer containing at least 50% by weight of a water-insoluble synthetic polymer, e.g. polymethyl methacrylate, coated at a ratio in dried state of 0.01 to 2 g/m2. Said covering layer is coated from a coating solution, the solvent medium of which consists of at least one organic solvent.

However, such a covering polymer layer is smooth. In various processes such as for the coating of a composition on a surface of a sheet or web material, which on its rear surface carries such a smooth covering layer, the web material when travelling lengthwise at high speed tends to float when nearing a rotating roller. Such floating is caused by the fact that air is picked up by the moving surfaces of the web and the roller and that some of this air becomes entrapped in the wedge-shaped space where the web approaches the roller surface. Owing to this floating an irregular application of coating composition is induced.

Moreover, because of the smoothness of the covering layer the sheet material tends to block while in contact with other members or surfaces.

Blocking could be avoided by incorporating in the covering layer of the web material polymer beads that protrude from said layer and thus act as spacing agents that provide a safe distance between said layer and contacting objects and thus guarantee an easy conveyability of the web material in respect of contacting surfaces. Such beads have been described e.g. in U.S. patent application no. 4,614,708. However, known polymer beads are not resistant against organic solvents, so that coating of a composition comprising such beads in a solution of waterinsoluble synthetic polymer in organic solvent(s) is not possible. The beads would dissolve completely or at least start sticking to each other and form large conglomerations.

SUMMARY OF THE INVENTION

It is therefore an object of the present invention to provide a method for preparing finely divided solid polymer beads that are insoluble in water, in organic solvents, and in mixtures of water and organic solvents, said method giving substantially quantitative yields.

Another object of the present invention is the use of such polymer beads as spacing agents in a covering layer of a sheet or web material such as in a covering layer of a recording material e.g. of a light-sensitive silver halide material, said covering layer prohibiting sticking thereof to a contacting surface, affording an improved conveyability to the sheet or web material in respect of contacting surfaces.

Other objects and advantages of the present invention will become clear from the further description and examples.

According to the present invention there is provided a method of preparing finely divided solid polymer beads that are insoluble in water, in organic solvents, and in mixtures of water and organic solvents, that have an average particle size in the range of from 0.5 to 5 pm and have a glass transition temperature of at least 40° C., comprising the steps of:

A) dissolving in an aqueous solvent mixture of water and at least one water-miscible polar organic solvent
  1) at least one Alpha,Beta-ethylenically unsaturated monomer (1) capable of forming a polymer that is soluble in the monomer(s) present in said aqueous solvent mixture but that is insoluble in said aqueous solvent mixture,
  2) at least one monomer (2) carrying at least one carboxy group in free acid form,
  3) at least one monomer (3) carrying at least one halogen atom,
  4) at least one free radical-forming polymerization initiator (e.g. potassium, sodium, or ammonium persulphate) that is soluble in the aqueous solvent mixture, and
  5) a graft-polymerizable polymer containing hydrophilic groups (e.g. sodium or potassium carboxylate or sulphonate groups, hydroxide groups, ethylene oxide groups, and amide or cyclic amide groups), and capable of forming a graft polymer that remains soluble in said aqueous solvent mixture,
  the weight ratio of said graft-polymerizable polymer to said monomer(s) (1) being in the range from 1.5 : 100 to 8 : 100, the ratio between said monomers (1), (2), and (3) being 80 to 98 mol% of (1), 1 to 10 mol% of (2), and I to 10 mol% of (3), and the weight ratio of polymerization initiator to said monomers (1), (2), and (3) together being from 0.1 : 100 to 5 : 100, and B) heating the solution obtained to a temperature from 50° C. to the reflux temperature thereof, with continuous stirring to initiate by polymerization the simultaneous massive formation of copolymer from said monomer(s) and precipitation thereof, and the formation of a small proportion of graft polymer, C) converting in the polymer beads obtained the carboxy groups ih free acid form into carboxylic acid salt groups e.g. carboxylic acid sodium or onium salt groups, by reaction thereof with a hydroxide of the alkali metal group e.g. sodium and potassium hydroxide, a hydroxide of the alkaline earth group, or an ammonium hydroxide e.g. a tetraalkyl ammonium hydroxide, and D) causing reaction in said polymer beads of said carboxylic acid salt groups with the halogen atoms to form ester cross-linkages, thus rendering said polymer beads insoluble in water, in organic solvents or in a mixture of water and organic solvents.

The present invention also provides a sheet or web material comprising a subbed or unsubbed hydrophobic resin support or paper support coated with at least one hydrophobic resin layer and on at least one side thereof a transparent surface or covering layer at a dry coverage in the range of 0.01 to 2 9/m2, preferably in the range of 0.05 to 1 g/m2, and containing at least 50 % by weight of a water-insoluble synthetic polymer and dispersed therein finely divided solid polymer beads obtained according to the above described method.

More in particular, the present invention provides such sheet or web material, wherein the said surface or covering layer has been provided on top of an antistatic layer containing for at least 70% by weight of colloidal silica having an average particle size not higher than 10 nm and a surface area of at least 300 m2/g, the colloidal silica being present in said antistatic layer at a coverage of at least 50 mg per m2.

The present invention further provides a light-sensitive silver halide material comprising a subbed or unsubbed hydrophobic resin support or paper support coated with at least one hydrophobic resin layer and having on said hydrophobic resin support or hydrophobic resin layer at least one lightsensitive silver halide emulsion layer and having on the opposite side of said support an above defined antistatic layer containing colloidal silica and an above defined transparent surface or covering layer in the given sequence, said covering layer comprising finely divided solid polymer beads obtained according to the above described method of the invention.

DETAILED DESCRIPTION OF THE INVENTION

The method of preparing insoluble polymer beads according to the present invention comprises the above-defined consecutive steps (A) to (D), wherein step (A) of dissolving monomer, which in the case of the present invention are the monomers (1) to (3) as above identified, a free radical-forming polymerization initiator, and a graft-polymerizable polymer containing hydrophilic groups in an aqueous solvent mixture of water and at least one water-miscible polar organic solvent, and step (B) of forming polymer beads by heating the solution obtained are carried out as described in EP-A 080,225 and corresponding U.S. patent application no. 4,614,708. The beads obtained at the end of step (B) are insoluble in water, but they are not resistant, however, to organic solvents or mixtures thereof with water and thus need further treatment in accordance with steps (C) and (D) of the method of the present invention to render them solvent-resistant.

By the term "solvent-resistant" as used hereinafter has thus to be understood "insoluble in water, in organic solvents, and in mixtures of water and organic solvents".

Details about the nature, concentrations, ratios, and use of the Alpha, Beta-ethylenically unsaturated monomer (1), about the free radical-forming polymerization initiator, about the graft-polymerizable polymer containing hydrophilic groups, about the aqueous solvent mixture, about the reaction conditions needed for making the non-solvent-resistant polymer beads, and about the nature and characteristics of the non-solvent-resistant polymer beads formed according to steps (A) and (B) can be found in the specification of EP-A 080,225 and corresponding U.S. patent application no. 4,614,708 and apply also for carrying out the steps (A) and (B) of the method of the present invention. Therefore, these details have to be considered as being incorporated herein by reference.

Suitable monomers (2) carrying at least one carboxy group in free acid form are e.g. unsaturated aliphatic carboxylic acids such as i.a. acrylic acid, methacrylic acid, crotonic acid, 3-methyl-crotonic acid, 3-butenoic acid, angelic acid, maleic acid, fumaric acid, glutaconic acid, itaconic acid, citraconic acid and unsaturated aliphatic/aromatic carboxylic acids such as i.a. vinylbenzoic acid. In fact, any unsaturated carboxylic acid will do, provided the carboxy group(s) thereof remain(s) unaffected in the free acid form during the heating step (B) that results in the formation of non-solvent-resistant polymer beads. Although the number of carboxy groups in free acid form present in monomer(s) (2) is not critical, preferably the content of such carboxy groups in said monomer(s) (2) is not higher than 10 mol%.

Suitable monomers (3) carrying at least one halogen atom are those wherein said halogen atom, in particular a chlorine atom or bromine atom, is attached to a carbon atom that is in Alpha-position in respect of an activating group such as e.g. —COO—, —OOC—, —COOCH$_2$—, —CH(OH)—, and an aromatic radical. Although the number of halogen atoms present in monomer(s) (3) is not critical, preferably the content of halogen atoms in said monomer(s) (3) is at least 1 mol%.

Specific examples of such monomers (3) that can be used in the method of the present invention are p- and m-vinylbenzyl chloride and mixtures thereof, Alpha-chloroacrylic acid, chloromethylacrylate, chloromethylmethacrylate, Alpha-chloroethylacrylate, Alpha-chloroethylmethacrylate, Beta-bromoethylacrylate, Beta-bromoethylmethacrylate, Gamma-chloro-Beta-hydroxypropyl acrylate, Gamma-chloro-Beta-hydroxypropyl methacrylate, vinyl bromoacetate, and vinyl chloroacetate.

The ratios of the monomers (1), (2), and (3) can be chosen at wish among the above defined ranges depending upon the particular needs such as the average size and size distribution of the polymer beads, and the glass transition temperature and resistancb thereof against mechanical deformation.

In the polymer beads obtained after graft-polymerization, which beads may be separated or not from the liquid phase, recurring units comprising carboxy groups in the free acid form are present.

During step (C) according to the method of the present invention at least part of these carboxy groups are converted into carboxylic acid salt groups e.g. alkali metal salt groups, alkaline earth metal salt groups, and ammonium salt groups by making said carboxy groups react with an alkali metal hydroxide e.g. sodium or potassium hydroxide, an alkaline earth metal hydroxide, or an ammonium hydroxide e.g. a tetraalkyl ammonium hydroxide. The conversion can be performed in the liquid phase in which the polymer beads have been formed during step (B). In case the polymer beads have been separated from the liquid phase the conversion reaction can be carried out in a solvent mixture of water and a water-miscible polar organic solvent e.g. a mixture of water and ethanol.

In step (D) at least part of the carboxylic acid salt groups present in recurring units deriving from the monomers (2) and at least part of the halogen atoms present in recurring units deriving from the monomers (3) are made to react with each other by heating so that ester cross-linkages are formed between adjacent molecule chains. As a consequence of the formation of these cross-linkages the polymer beads become solvent-resistant.

The solvent-resistant polymer beads may be separated from the liquid phase according to known methods e.g. by freeze-drying, spray-drying, centrifuging, and evaporation of the liquid phase.

In making a sheet or web material according to the present invention the separated solvent-resistant polymer beads can be added to the coating composition for the covering layer, optionally together with other coating additives.

Sometimes, it may not be necessary, however, to separate the polymer beads from the liquid phase. If desired, they can indeed be added as a dispersion in the liquid phase to the coating composition for the covering layer. Such coating composition can then be coated on e.g. an antistatic layer containing colloidal silica.

A preferred sheet or web material according to the present invention thus comprises in the given sequence:

a subbed or unsubbed hydrophobic resin support e.g. a polyethylene terephthalate support or a paper support coated with at least one hydrophobic resin layer e.g. a polyethylene terephthalate layer, an antistatic layer containing for at least 70% by weight, preferably for at least 80% by weight, of colloidal silica having an average particle size not higher than 10 nm, preferably not higher than 7 nm and a surface area of at least 300 m2 per gram, preferably of about 500 m2 per gram, the colloidal silica being present in said antistatic layer at a coverage of at least 50 mg per m2, preferably of 100 mg to 500 mg per m2, and a transparent surface or covering layer whose sticking power to a contacting surface is poorer than to said antistatic layer, said covering layer containing at least 50 % by weight of a water-insoluble synthetic polymer, preferably polymethyl methacrylate, and coated at a dry coverage in the range of 0.01 to 2 g/m2, preferably in the range of 0.05 to 1 g/m2, said covering layer also comprising a dispersion of solid non-abrasive spherical polymer beads that are insoluble in water, in organic solvents, or in a mixture of water and organic solvent, that have an average particle size in the range of from 0.5 to 5 $\mu$m, and that have a substantially uniform size frequency distribution.

The covering layer containing solvent-resistant polymer beads in accordance with the present invention has a thickness varying between about 0.5 and about 3 $\mu$m. The thickness of said layer is lower than the average size of the polymer beads so that in fact a large number of these polymer beads protrude from the layer. For instance in a layer having a thickness of 0.5 to 1.0 $\mu$m, beads sizing 1.0 to 2.0 pm can be used.

In general, the amount of solvent-resistant polymer beads present in the covering layer does not exceed 1% by weight of the total weight of the covering layer. Preferably, however, 0.01 to 0.05 % by weight of polymer beads is used in respect of the total weight of the covering layer. The preferred size of the polymer beads incorporated into the covering layer is between 0.6 and 3.2 μm.

Thanks to the presence of these protruding polymer beads in the covering layer of the sheet material contact between the latter layer and other surfaces only exists at the smooth tops of the protruding beads and these other surfaces. In this way sticking is avoided and at the same time the dry friction surface and as a consequence thereof the mechanical resistance are greatly reduced so that the conveyability of the sheet material is improved substantially.

The antistatic layer used in accordance with a sheet material of the present invention consists for at least 70Y. by weight of colloidal silica having an average particle size not higher than 10 nm and a surface area of at least 300 m2/g. The colloidal silica is present in said antistatic layer at a coverage of at least 50 mg per m2, preferably of 100 mg to 500 mg per m2.

The surface area of the colloidal silica is determined according to the BET-value method described by S. Brunauer, P. H. Emmett and E. Teller, J.Amer. Chem. Soc. 60, 309–312 (1938).

Particularly low surface resistivity values are obtained by using an antistatic layer consisting for at least 80 % by weight of colloidal silica having a surface area of 500 m2/g and having an average grain size not higher than 7 nm. Such type of silica is sold under the name KIESELSOL 500 (KIESELSOL is a registered trade name of Farbenfabriken Bayer AG, Leverkusen, West-Germany).

In dry state antistatic layers only consisting of colloidal silica may show micro-cracks that lower the lateral conductivity. Micro-cracking can be counteracted effectively by mixing the silica with synthetic hectorite clay. A synthetic hectorite clay is a magnesium silicate having a crystal lattice structure in which magnesium ions, optionally partially replaced by lithium ions and/or sodium ions, are bound in octahedral relationship with hydroxyl ions, some of which may have been replaced by fluorine atoms as mentioned in U.S. patent application no. 4,173,480, in which the use of synthetic hectorite as antistatic additive to a layer containing silica has been described.

The antistatic layer may contain the synthetic hectorite in admixture with the colloidal silica in a weight ratio in the range of 1:20 to 1:4. Synthetic hectorite clay is commercially available under the trade name LAPONITE S by Laporte Industries Ltd., UK.

The coating of the above defined antistatic layer composition is performed from an aqueous colloidal dispersion either or not in the presence of a surface-active agent, which may be an anionic or a non-ionic surface-active agent.

The molecule of an anionic surface-active agent contains a hydrophobic residue and non-dissociatively linked thereto an anionic part that is neutralized with a dissociative cation. Examples of suitable anionic surface active agents are alkylaryl polyether sulfonates described in US-A 3,525,621 and the disodium salt of 2-heptadecyl-benzimidazole disulphonic acid sold under the trade name ULTRAVON W by Ciba A.G. Switzerland.

Non-ionic wetting agents suitable for use in the antistatic layer containing silica layer are e.g. a $C_{12}$-$C_{18}$ alkylphenol polyethylene oxide ether such as dodecylphenol polyethylene oxide ether or saponine. Of course, other surface-active agents may be used as well. A survey of surface-active agents can be found in e.g. Tensid-Taschenbuch Herausgegeben von Dr. Helmut Stache - Carl Hanser Verlag München Wien (1979).

The weight ratio of colloidal silica to surface-active agent may vary within wide ranges e.g. from about 5:1 to 200:1.

In the production of a suitable transparent surface or covering layer having a poor sticking power to a layer containing gelatin hydrophobic water-insoluble synthetic polymers having a glass transition temperature above 40° C. are used preferentially.

Examples of such hydrophobic water-insoluble synthetic polymers are e.g. polymethyl methacrylate, polyisobutyl methacrylate, polycarbonate, mixed polyester-carbonates and polycarbonate/polystyrene blends that can be dissolved in acetone, methoxy-1-propanol-2, methyl isobutyl ketone and the like.

Said hydrophobic water-insoluble synthetic polymers are dissolved in an organic solvent or in a mixture of organic solvents and the solvent-resistant polymer beads of the present invention are dispersed therein. The resulting solution comprising dispersed polymer beads can be used as such for coating a transparent surface or covering layer according to the present invention.

The coating composition for the covering layer may contain other ingredients or substances such as matting agents, coating aids, lubricants or substances reducing friction e.g. waxes, silicone resins or fluorinated polymers, optionally in particulate form.

A sheet or web material according to the present invention may comprise more than one antistatic layer, each such layer incorporating the colloidal silica as defined herein and at least one such layer carrying a covering layer comprising solvent-resistant polymer beads as defined herein.

An important use of the above defined antistatic layer and covering layer is in the manufacture of photographic silver halide emulsion materials having a hydrophobic resin support or a paper support coated with a hydrophobic resin.

Hydrophobic resin supports useful in the manufacture of photographic silver halide emulsion materials are well known to those skilled in the art and are made e.g. of polyester, polystyrene, polyvinyl chloride or polycarbonate, preference being given to polyethylene terephthalate. A preferred resincoated paper support is a poly-Alpha-olefin-coated paper support such as a polyethylene-coated paper support.

The hydrophobic resin support may be provided with one or more subbing layers known to those skilled in the art for adhering thereto a hydrophilic colloid layer. Suitable subbing layers for polyethylene terephthalate supports have been described in e.g. U.S. patent application no. 3,397,988, 3,649,336, 4,123,278, and 4,478,907.

A sheet or web material provided according to the present invention with the above defined antistatic layer and covering layer comprising solvent-resistant polymer beads is advantageously used as a support for (a) silver halide emulsion layer(s) forming a photographic silver halide emulsion-type material in which the antistatic layer and covering layer are preferably at the side of the sheet that is opposite to that carrying the silver halide emulsion layer(s).

By the above defined antistatic layer/covering layer assemblage it is possible to reduce the surface resistivity of a sheet or web material according to the present invention to a value lower than $10^{10}$ ohm/square at a relative humidity (R.H.) of 30 %.

The surface resistivity expressed in ohm/square (ohm/sq.) is obtained as follows:

after having been coated, the resulting antistatic layer is dried and conditioned at a specific relative humidity and temperature, two conductive rubber poles having a length of 10 cm are placed in contact with said antistatic layer, the poles being parallel to each other at a distance of 1 cm from one another, the resistivity built up between said electrodes is measured with a precision ohm-meter, and the ohm value measured is multiplied by 10, thus resulting in an ohm/square value.

The photographic silver halide emulsion materials containing an antistatic layer and an adjacent covering layer of water-insoluble synthetic polymer comprising solvent-resistant polymer beads according to the present invention may serve different purposes. They may be black-and-white or colour photographic materials. Application fields, in which said photographic materials can find an interesting use are i.a. continuous tone or halftone photography, microphotography, radiography, silver complex diffusion transfer reversal (DTR-processes), and dye diffusion transfer processes operating with silver halide emulsion layers.

Apart from its use in photographic silver halide emulsion materials the antistatic layer/covering layer assemblage can also be employed in non-light-sensitive materials serving as image-receiving material in DTR-processes or in a dye diffusion transfer processes as described in e.g. Angew. Chem. Int. Ed. Engl. 22, (1983) p. 191–209.

For the composition of silver halide emulsion layers reference can be made e.g. to Research Disclosure 17,643 of December 1978 and Research Disclosure 307,105 of November 1989.

A recording material having an antistatic layer containing the above defined colloidal silica covered with said water-insoluble synthetic polymer covering layer comprising solvent-resistant polymer beads is far less susceptible to static charges. For instance, static charges caused by contact of the surface of a silver halide emulsion layer with the opposite side of the recording material or caused by friction with substances such as rubber and hydrophobic polymeric binder e.g. the binder component of phosphor screens used as X-ray intensifying screens, can be reduced markedly by the use of the antistatic layer/covering layer assemblage in accordance with the present invention. The buildup of static charges and subsequent dust attraction and/or sparking e.g. during loading of films in cassettes such as in X-ray cassettes, or during transport in cameras e.g. microfilm cameras, flow cameras, and movie cameras, or during transport in projectors, can be avoided substantially.

Although the above defined antistatic layer/covering layer assemblage is particularly useful in increasing the conductivity of photographic silver halide emulsion materials it is likewise useful in increasing the conductivity of photographic materials based on diazotype compositions, vesicular-image-forming materials, magnetic recording materials, electrographic or electrophotographic recording materials and mounting or drafting film.

The preparation of polymer beads for use in accordance with the invention is illustrated in the following preparation examples, the average size of the polymer beads stated therein being determined with the aid of a COULTER COUNTER (registered trade mark) Model TA II particle size analyser marketed by Coulter Electronics Ltd., Coldharbour Lane, Harpenden, Hertfordshire, AL 54 UN, United Kingdom. The Coulter principle is based on an electric path of small dimensions, which is modulated by momentary passage of each particle one-by-one. Particles suspended in an electrolyte are forced through a small aperture, which in the present case has a diameter of 30 $\mu$m and across which an electric current path has been established. Each particle displaces electrolyte in the aperture producing a pulse equal to its displaced volume. Thus, three dimensions, or particle volume response is the basis for all measuring. The average size of the polymer beads versus their relative volume (weight) or number is given by the instrument. The recorder plots histograms on number and weight basis.

PREPARATION 1: cross-linked solvent-resistant co(methyl methacrylate/acrylic acid/vinyl benzyl chloride) (90/5/5 % by weight or 89.8/6.9/3.3 mol%) beads stabilized with a graft copolymer of methyl methacrylate/acrylic acid/vinyl benzyl chloride) and co(-styrene/maleic acid monosodium salt).

a) Preparation of non-solvent-resistant polymer beads

At room temperature 186.7 g of co(styrene/maleic acid/maleic acid anhydride) (molar ratio : 50/10/40) is added to 700 g of water and made to dissolve therein by addition with stirring of 97.2 ml of 5N sodium hydroxide to pH 7.0.

The solution obtained is filtered and then diluted with distilled water up to a total weight of 1.0 kg of solution comprising 220 g of the copolymer styrene/maleic acid/maleic acid monosodium salt.

A weight of 458.00 g of the solution obtained is diluted with 3276.0 g of demineralized water in a 10 litre reaction vessel equipped with a nitrogen inlet, a reflux condenser, a thermometer, and a stirrer.

The solution is heated up to 70° C. with continuous stirring whilst the volume above the liquid level is rinsed with nitrogen.

An amount of 9.0 g of potassium persulphate is added to the solution, which is then heated for another hour at 70° C.

The speed of the stirrer is set at 75 rpm. Next, the following ingredients are added consecutively under nitrogen atmosphere : 3222 ml of ethanol, 1620 g of methyl methacrylate (not distilled previously), 90 g of acrylic acid (not distilled previously), and 90.0 g of vinyl benzyl chloride. The vinyl benzyl chloride is a mixture consisting of 68.2% of m-vinyl benzyl chloride, 22.8% of p-vinyl benzyl chloride, and 9.0% of vinyl benzyl chloride isomer having 1 or 2 chlorine atoms. The compound is cooinercially available from Nagase Company, representing Seimi Chemical Company of Japan.

In spite of continued heating the temperature in the reaction vessel drops to about 65° C. as a result of this addition. However, the temperature gradually starts rising and reaches 70° C. again after about 45 min.

After some 20 min the first turbidity is seen, which gradually turns into a milky white dispersion.

After a total heating time of 4 h at 70° C. subsequent to the addition of the monomers the nitrogen inlet is sealed.

The ph-value of the resulting dispersion of polymer beads is 4.5.

b) Cross-linking to make the polymer beads solvent-resistant

The speed of the stirrer is set at 150 rpm. A mixture of ethanol and water having a boiling point at 82°–85° C. is distilled off from the dispersion and an almost identical volume of demineralized water is added dropwise and continuously. In total, a total volume of 2.5 l of ethanol/water is collected and 2.0 l of demineralized water is added. As soon as a volume of 1.5 l of ethanol/water has been collected and simultaneously a volume of 1.5 l of demineralized water has been added dropwise, a volume of 232 ml of 5N sodium hydroxide is added dropwise in 15 min to the dispersion. The ph-value of the dispersion rises from about 4.0 to about 7.5.

When in total 2.5 l of ethanol/water has been collected and simultaneously a volume of 2.0 l of demineralized water has been added dropwise, the temperature in the dispersion has risen gradually to 91° C.

The bead dispersion was cooled with stirring to about 30° C. by means of cold tap water and next filtered through filtering paper having a mesh width of about 15 μm. Filtering is easy and a maximum of 1.0 g of polymer remains in amorphous form on the filter.

Yield : 7970 g of dispersion at pH 7.4 comprising 23.6 g of dry residue per 100 g of dispersion.

The average size of the polymer beads measured with the aid of the COULTER COUNTER Model TA II (aperture having a diameter of 30 μm) is 1.03 pm when measured in number percent and of 1.15 μm when measured in volume percent.

The dried polymer beads are insoluble in acetone, butanone, tetrahydrofuran, and dioxan.

In contrast, polymer beads prepared in the same way but without acrylic acid and vinyl benzyl chloride as comonomers remain soluble in these organic solvents and can consequently not be used for the purpose of the present invention.

PREPARATION 2 : cross-linked solvent-resistant co(methyl methacrylate/ methacrylic acid/vinyl benzyl chloride) (75/20/5 % by weight or 73.87/22.90/3.23 mol%) beads stabilized with a graft copolymer of methyl methacrylate/methacrylic acid/vinyl benzyl chloride) and co(styrene/maleic acid monosodium salt).

The procedure described in Preparation I is repeated with the only difference that 22.9 mol% of methacrylic acid monomer is used instead of 6.9 mol% of acrylic acid.

Homodisperse polymer beads having a diameter of about 2.0 um are obtained. By addition of sodium hydroxide to the dispersion until a ph-value of 6.0 is reached, crosslinked milky white beads are formed.

The homodisperse polymer beads obtained have an average size of 1.82 μm when measured in number percent and 1.91 pm when measured in volume percent.

By addition of further amounts of sodium hydroxide a transparent viscous bead dispersion comprising highly swollen solvent-resistant beads is obtained.

The now heterodisperse polymer beads have an average size of 1.27 μm when measured in number percent and of 3.17 pm when measured in volume percent.

In an analogous way as described in Preparation I an amount of 7680 g of bead dispersion comprising 21.3 g of residue per 100 g of dispersion is obtained. The pH of the dispersion is 3.5. The ingredients used are :

| | |
|---|---|
| the aqueous copoly(styrene/maleic acid/maleic acid monosodium salt) solution (pH = 7) described in Preparation 1 and comprising 22.0 g of product per 100 g of solution | 345.45 g |
| demineralized water | 3279.35 g |
| potassium persulphate | 15 g |
| ethanol | 3548.85 ml |
| vinyl benzyl chloride (see Preparation 1) | 76 g |
| methacrylic acid (not distilled previously) | 304 g |
| methyl methacrylate (not distilled previously) | 1140 g | and 152 g of a solution in 114 ml of demineralized water of 38.0 g of MERSOLAT, which is a trade mark for a surfactant sold by Bayer.

At the end of the bead preparation the dispersion is cooled to 30° C. with stirring and filtered through a nylon cloth having a mesh width of 60 μm. Yield : 7680 g of dispersion at pH 3.5 comprising 21.3 g of dry residue per 100g of bead dispersion.

The average size of the polymer beads measured with the aid of the COULTER COUNTER Model TA II (aperture having a diameter of 30 um) is 1.82 μm when measured in number percent and of 1.91 pm when measured in volume percent.

With the bead dispersion obtained according to Preparation 2 and comprising mol% of methacrylic acid and 3.23 mol% of vinyl benzyl chloride units, the following characteristics are obtained Polymer dispersion in acid form (pH 3.5)

The polymer beads obtained by freeze-drying of the bead dispersion obtained according to Preparation 2 and having pH 3.5, followed by further drying for 24 h at 50° C., are insoluble in water and organic solvents such as tetrahydrofuran, ketones, alcohols, butyl acetate, and ethyl acetate.

Polymer dispersion in sodium salt form

By addition of sodium hydroxide up to pH 6.0

The originally obtained dispersion according to Preparation 2 remains unchanged and thinly fluid, the polymer beads having an unaltered homodisperse bead size. The average size of the polymer beads measured with the aid of the COULTER COUNTER Model TA II (aperture having a diameter of 30 μm) is 1.91 pm when measured in number percent and of 1.91 μm when measured in volume percent. After freeze-drying, the beads are insoluble in organic solvents.

By addition of sodium hydroxide up to pH 7.5

The originally obtained dispersion according to Preparation 2 becomes a transparent viscous dispersion comprising highly swollen heterodisperse insoluble beads.

The average size of the polymer beads measured with the aid of the COULTER COUNTER Model TA II (aperture having a diameter of 30 μm) is 1.27 pm when measured in number percent and of 3.17 pm when measured in volume percent.

PREPARATION 3 : cross-linked solvent-resistant co(methyl methacrylate/ stearyl methacrylate/methacrylic acid/vinyl benzyl chloride) (85/2.5/10/2.5 % by weight or 85.70/0.95/11.70/1.95 mol%) beads stabilized with a graft copolymer of methyl methacrylate/stearyl methacrylate/methacrylic acid/vinyl benzyl chloride) and co(styrene/maleic acid monosodium salt).

In an analogous way as described in Preparation 1 an amount of 7870 g of bead dispersion comprising 20.4 g of residue per 100 g of dispersion is obtained. The pH of the dispersion is 4.5. The ingredients used are :

| | |
|---|---|
| the aqueous copoly(styrene/maleic acid/maleic acid | 172.72 g |

-continued

| | |
|---|---|
| monosodium salt) solution (pH = 7) described in Preparation 1 and comprising 22.0 g of product per 100 g of solution | |
| demineralized water | 2925 g |
| potassium persulphate | 7.6 g |
| ethanol | 3903.73 ml |
| vinyl benzyl chloride (see Preparation 1) | 38.0 g |
| methacrylic acid (not distilled previously) | 152.0 g |
| stearyl methacrylate (not distilled previously) | 38.0 g |
| methyl methacrylate (not distilled previously) | 1292.0 g | and 152 g of a solution in 114 ml of demineralized water of 38.0 g of the above identified MERSOLAT.

At the end of the bead preparation the dispersion is cooled to 30° C with stirring and filtered through a nylon cloth having a mesh width of 60×60 Yield : 7870 g of dispersion at pH 4.5 comprising 20.4 g of dry residue per 100 g of bead dispersion.

The dispersion is dried in an air current at 45° C. The dried polymer beads are insoluble in ethanol, acetone, butanone, tetrahydrofuran, and ethyl acetate.

The average size of the polymer beads measured with the aid of the COULTER COUNTER Model TA II (aperture having a diameter of 30 μm) is 2.32 pm when measured in number percent and of 2.47 μm when measured in volume percent.

By addition of sodium hydroxide to the bead dispersion at room temperature up to pH =6.5 a thin-flowing bead dispersion is obtained. The average size of the polymer beads is 2.39 μm when measured in number percent and 2.60 μm when measured in volume percent.

The dispersion is dried in an air current at 45° C. The dried polymer beads are insoluble in ethanol, acetone, butanone, tetrahydrofuran, and ethyl acetate.

By addition of sodium hydroxide to the bead dispersion at room temperature up to pH =7.1 a highly swollen mass of crosslinked beads is obtained. These beads cannot be used anymore.

The examples set forth hereinafter are directed to the use of a covering layer/antistatic layer assemblage described herein on a subbed polyethylene terephthalate resin support but other resin supports e.g. supports made of polystyrene, polyvinyl chloride or polyethylene either or not treated with a corona discharge and/or subbed with (a) subbing layer(s) for improving the adherence of hydrophilic colloid layers will likewise have the advantages of the present invention when they are coated with said antistatic layer/ covering layer assemblage.

The following examples illustrate the present invention.

EXAMPLE 1

A comparison material was made as follows.

A subbed polyethylene terephthalate support having a thickness of 0.63 μm was coated with an antistatic layer from the following coating composition

| | |
|---|---|
| aqueous dispersion I | 136 ml |
| aqueous dispersion II | 280 ml |
| ULTRAVON W (trade name) | 2 ml |
| ethanol | 100 ml |
| distilled water | 482 ml |

Aqueous dispersion I contains 16.5 g per 100 ml of colloidal silica having a surface area of 500 m2 per g and an average grain size lower than 7 nm, sold under the trade name KIESELSOL 500 by BAYER A.G. W.-Germany.

Aqueous dispersion II contains 2 g per 100 ml of synthetic hectorite clay sold under the trade name LAPONITE S by LAPORTE INDUSTRIES Ltd., U.K. ULTRAVON W is the trade name for the disodium salt of 2-heptadecylbenzimidazole disulfonic acid sold by Ciba A.G. Switzerland, (used here in the form of a 10 % solution in a water/ethanol mixture (90/10 by volume).

The antistatic layer was coated at a wet coverage of 140 m2/liter.

The dried antistatic layer was then covered with a coating solution for forming a covering layer comprising I g/m2 of polymethyl methacrylate. The solvent for the coating solution was a mixture of 80 parts by volume of acetone and 20 parts by volume of methoxy-1-propanol-2. The coating solution comprised 55 g/l of polymethyl methacrylate. The comparison material obtained did not comprise any polymer beads.

The procedure of coating a polyethylene terephthalate support with an antistatic layer and a covering layer as above described was repeated thrice with the only difference that solvent-resistant polymer beads prepared as described in Preparation 1 were added now to the coating solution in different amounts such that the covering layer had a dry weight of solvent-resistant polymer beads of 1 mg/m2 (Material A), 5 mg/m2 (Material B), and 10 mg/m2 (Material C) respectively.

In a first series of measurements the friction coefficient of the resulting 4 materials was determined—prior to any treatment thereof with photographic baths - by dragging the covering layer side of each material over a stainless steel surface. The friction coefficient of an object is an abstract number obtained by dividing the force necessary to drag said object over a contacting surface by its own weight.

During a second measurement of the friction the covering layer side was dragged over a glass surface. During a third measurement the covering layer was dragged over a gelatin silver halide emulsion layer (AgX layer) of a photographic element. The value given for static friction is the maximum value measured from the start of the pulling operation up to 2.2 s after the start. The value given for dynamic friction is the maximum value measured from 4.7 to 15 s after the start.

In a second series of measurements the friction coefficient was determined after treatment of the material with photographic baths.

The results of the friction measurements are listed in Table 1.

TABLE 1

| Material | FC (stainl. steel) | | FC (glass) | | FC (AgX layer) | |
|---|---|---|---|---|---|---|
| | Static | Dynamic | Static | Dynamic | Static | Dynamic |
| A. Friction coefficient (FC) measured prior to processing | | | | | | |
| Comparison | 0.63 | — | 1.10 | 2.7 | 0.35 | 0.28 |
| A | 0.60 | — | 0.60 | 0.7 | 0.35 | 0.31 |
| B | 0.59 | — | 0.39 | 0.4 | 0.27 | 0.27 |
| C | 0.54 | — | 0.38 | 0.6 | 0.26 | 0.24 |
| B. Friction coefficient (FC) measured after processing | | | | | | |
| Comparison | 0.61 | 0.52 | 0.90 | 0.67 | 0.54 | 0.50 |
| A | 0.59 | — | 0.52 | 0.37 | — | 0.43 |
| B | 0.41 | 0.46 | 0.44 | 0.45 | 0.44 | 0.43 |
| C | 0.44 | 0.45 | 0.37 | 0.29 | 0.44 | 0.43 |

It is shown by these results that thanks to the presence of solventresistant polymer beads as spacing agents in the covering layer the static friction coefficient is lowered substantially and that the dynamic friction coefficient is lowered especially for glass contact surfaces. Sticking of said covering layer to a contacting surface is prohibited and an improved conveyability of the sheet or web material in respect of contacting surfaces is obtained as a result of reduced mechanical resistance. This reduced mechanical resistance also leads to a reduction of abrasion, scratching, and dust formation.

EXAMPLE 2

The materials described in Example 1 were made with the only difference that the covering layer now comprised 100 mg/m2 of polymethyl methacrylate instead of I g/m2.

The friction coefficients were determined as described in Example 1. The results of the measurements are listed in Table 2.

TABLE 2

| Material | FC (stainl. steel) | | FC (glass) | | FC (AgX layer) | |
|---|---|---|---|---|---|---|
| | Static | Dynamic | Static | Dynamic | Static | Dynamic |
| A. Friction coefficient (FC) measured prior to processing | | | | | | |
| Comparison | 0.56 | 0.46 | >3.60 | >3.60 | 0.32 | 0.26 |
| A | 0.52 | — | 0.35 | 0.39 | 0.23 | 0.25 |
| B | 0.55 | 0.45 | 0.41 | 0.40 | 0.32 | 0.24 |
| C | 0.53 | 0.42 | 0.37 | 0.36 | 0.28 | 0.23 |
| B. Friction coefficient (FC) measured after processing | | | | | | |
| Comparison | 0.62 | 0.60 | 0.75 | 0.61 | 0.49 | |
| A | 0.58 | 0.52 | 0.42 | 0.44 | — | |
| B | 0.44 | 0.39 | 0.33 | 0.27 | 0.42 | |
| C | 0.42 | 0.43 | 0.38 | 0.34 | 0.42 | |

Claims:

1. Sheet or web material comprising a subbed or unsubbed hydrophobic resin support or paper support coated with at least one hydrophobic resin layer and on at least one side thereof a transparent surface laser or covering layer at a dry coverage in the range of 0.01 to 2 g/m2 and containing at least 50 % by weight of a water-insoluble synthetic polymer and dispersed therein finely divided solid polymer beads obtained by the steps of
   A) dissolving in an aqueous solvent mixture of water and at least one water-miscible polar organic solvent
      1) at least one Alpha,Beta-ethylenically unsaturated monomer (1) capable of forming a polymer that is soluble in the monomer(s) present in said aqueous solvent mixture but that is insoluble in said aqueous solvent mixture,
      2) at least one monomer (2) carrying at least one carboxy group in free acid form,
      3) at least one monomer (3) carrying at least one halogen atom,
      4) at least one free radical-forming polymerization initiator that is soluble in the aqueous solvent mixture, and
      5) a graft-polymerizable polymer containing hydrophilic groups and capable of forming a graft polymer that remains soluble in said aqueous solvent mixture,
      the weight ratio of said graft-polymerizable polymer to said monomer(s) (1) being in the range from 1.5 : 100 to 8 : 100, the ratio between said monomers (1), (2), and (3) being 80 to 98 mol% of (1), 1 to 10 mol% of (2), and 1 to 10 mol% of (3), and the weight ratio of polymerization initiator to said monomers (1), (2), and (3) together being from 0.1 : 100 to 5 : 100, and
   B) heating the solution obtained to a temperature from 50° C. to the reflux temperature thereof, with continuous stirring to initiate by polymerization the simultaneous massive formation of copolymer from said monomer(s) and precipitation thereof, and the formation of a small proportion of graft polymer,
   C) converting in the polymer beads obtained the carboxy groups in free acid form into carboxylic acid salt groups, and
   D) causing reaction in said polymer beads of said carboxylic acid salt groups with the halogen atoms to form ester cross-linkages, thus rendering said polymer beads insoluble in water, in organic solvents or in a mixture of water and organic solvents.

2. A sheet or web material according to claim 1, wherein said surface or covering layer is provided on top of an antistatic layer containing for at least 70% by weight of colloidal silica having an average particle size not higher than 10 nm and a surface area of at least 300 m2/g, the colloidal silica being present in said antistatic layer at a coverage of at least 50 mg per m2.

3. A sheet or web material according to claim 1, wherein said hydrophobic resin is polyethylene terephthalate.

4. A sheet or web material according to claim 1, wherein said covering layer has been coated at a dry coverage in the range of 0.05 to 1 g/m2.

5. A sheet or web material according to claim 1, wherein said water-insoluble synthetic polymer is polymethyl methacrylate.

6. A sheet or web material according to claim 1, wherein said covering layer comprises 0.01 to 0.05% by weight of said polymer beads in respect of the total weight of said covering layer.

7. A sheet or web material according to claim 1, wherein the size of said polymer beads is between 0.6 and 3.2 µm.

8. A sheet or web material according to claim 1, wherein said sheet or web material is a light-sensitive silver halide material comprising a subbed or unsubbed hydrophobic resin support or paper support coated with at least one hydrophobic resin layer and having on said hydrophobic resin support or hydrophobic resin layer at least one light-sensitive silver halide emulsion layer and having on the opposite side of said support the said transparent surface or covering layer.

* * * * *